INVENTOR.
KATSUYA ATSUMI
BY
Eyre, Mann & Lucas

INVENTOR.
KATSUYA ATSUMI
BY
Eyre, Mann & Lucas

INVENTOR.
KATSUYA ATSUMI
BY
Eyre, Mann & Lucas

United States Patent Office 3,365,551

Patented Jan. 23, 1968

3,365,551

NONDISCHARGING CAPACITOR-SUPPRESSED CIRCUIT FOR DRIVE MOTOR OF TAPE RECORDER

Katsuya Atsumi, Kohjiya-cho, Ohta-ku, Tokyo, Japan, assignor to Akai Electric Company, Limited, Tokyo, Japan, a corporation of Japan Filed Mar. 17, 1964, Ser. No. 352,617
6 Claims. (Cl. 179—100.2)

This invention relates to improvements in and relating to tape drive mechanisms of portable magnetic tape recording and reproducing machines, briey called "the tape recorder" or still more briefly "the machine" hereinafter.

Portable tape recorders have found wide use in amateur as well as professional fields and these machines are now frequently designed to give the user the option of selective D.C. or A.C. powered operation.

Batteries are valuable and very high in price, and therefore, considerable efforts have been made by the machine designers in this field to avoid unnecessary power consumption as much as possible.

The machine usually employs at least a condenser for supressing undesirous ripples. The existence of such condenser is of no importance when the machine is powered from an A.C. power source. However, when the machine operates with D.C. current supplied from batteries, the condenser will discharge the charged energy upon each shut-off operation of the drive motor for the conventional tape reeling mechanism. With repetition, this discharged energy will amount to a considerable value so that the useful life of the batteries will be correspondingly shortened.

It is therefore the main object of the invention to provide an efficient tape drive control mechanism capable of avoiding otherwise possible power loss in the above-described sense.

The conventional tape drive mechanism is so designed that one or more tape-reeling motors are kept driven even when the machine is at its idling period prior to the initiation of any practical machine operation such as recording reproducing, record monitoring, fast feeding or fast rewinding.

It is an object of the present invention to provide an efficient tape drive control mechanism which is capable of avoiding any idle running of the tape reeling motor.

On the other hand, when the machine is powered from an A.C. source with use of an A.C. adapter, a considerably higher voltage may frequently be impressed upon electronic elements of the machine, especially under non-load condition, than that of the design operating voltage. If such a higher voltage should be impressed, certain electronic elements such as transistors may become damaged.

Further object of this invention is to provide an efficient tape drive control mechanism capable of obviating such harmful impression of higher input voltages.

A still further object of this invention is to provide a tape drive control mechanism capable of attaining the above-mentioned efficient features automatically with regular manual control of the tape reeling mechanism.

These and other features of the invention will be better understood from the following detailed description when read with reference to the accompanying drawings in which.

Figures 1, 2, 5, 6, 7:
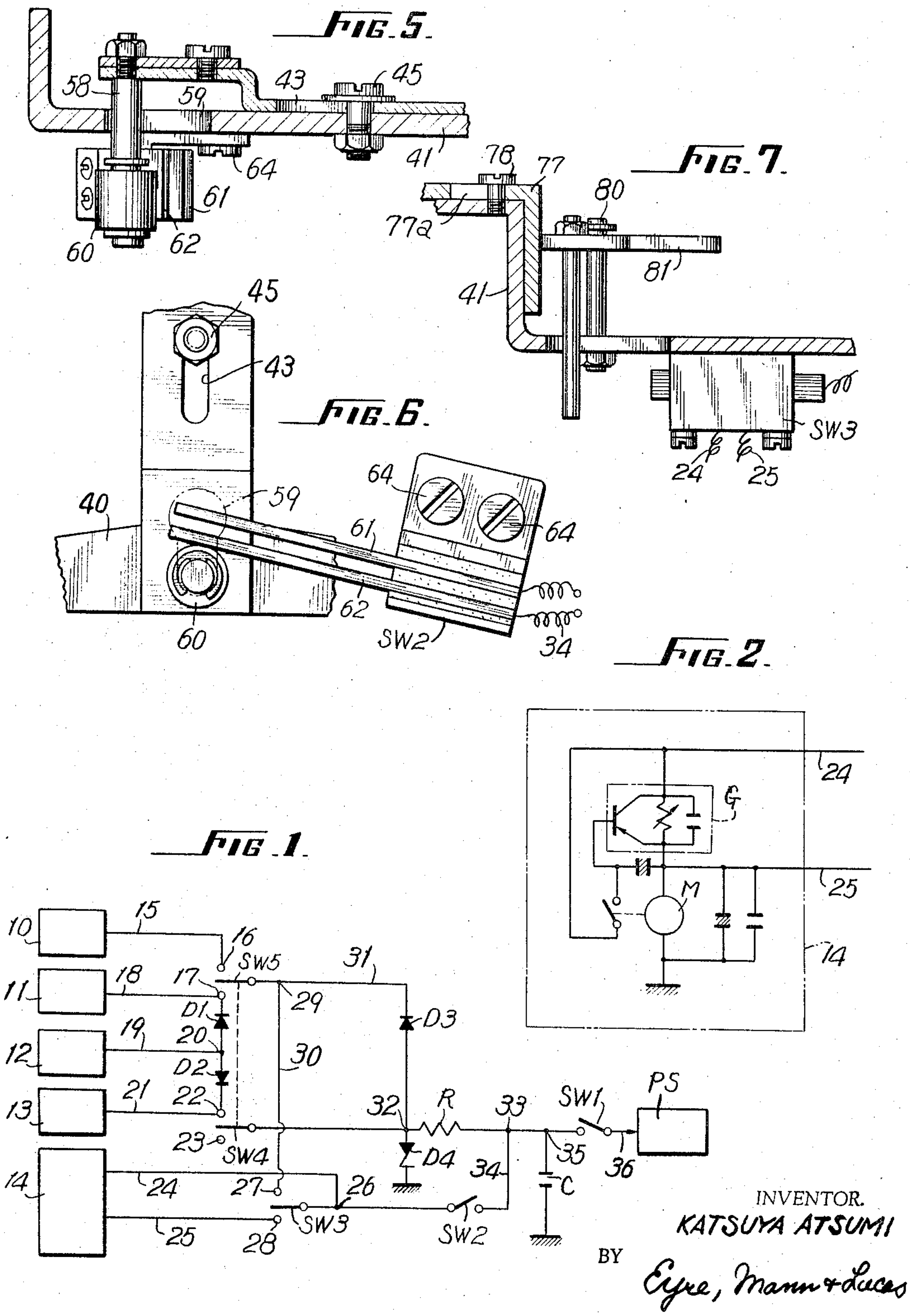
FIG. 1 is a schematic block and circuit diagram of electric and electronic components of the tape drive mechanism embodying the principles of the invention, with the circuit being powered by a direct current source of negative polarity.
FIG. 2 is a schematic connection diagram of the motor circuit shown in FIG. 1.
FIG. 5 is an enlarged partial sectional view seen in the right-hand direction from a plane passing through the parts 58 and 45 in FIG. 3, said parts not being sectioned.
FIG. 6 is an inverted and enlarged view of the motor circuit control switch specifically shown in FIGS. 3 and 5.
Figure 3:
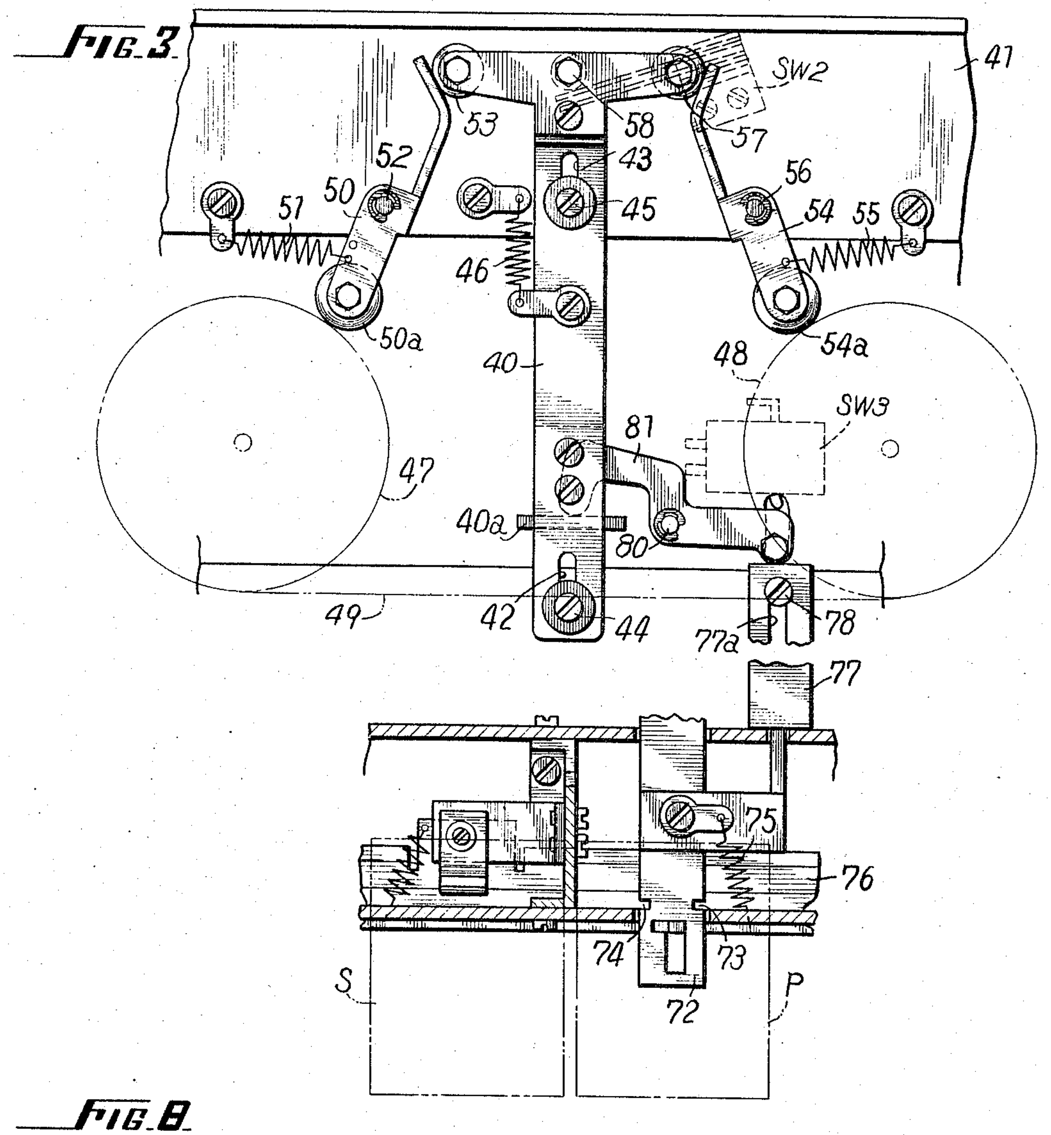
FIG. 3 is a schematic view, partially sectioned, of a push-button controled brake mechanism in its on-service position in the machine adapted to operate in combination with the electrical circuit shown in FIGS. 1–2.
Figure 8:
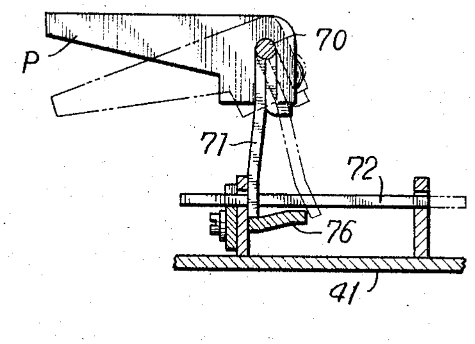
Figure 9:
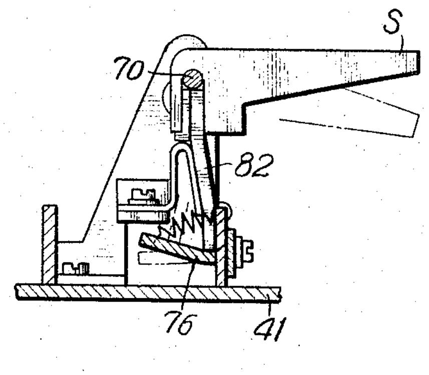

FIG. 7 is an enlarged partial sectional view of a transfer switch shown in FIG. 3, said view being seen in the left-hand direction from a plane passing through the parts 78 and 77, said part 78 and said transfer switch not being sectioned;

FIG. 8 is a partially sectional elevation of a play control push button which is representative of a plurality of operation-control buttons employed; and FIG. 9 is a partially sectional elevation of a stop push button employed.

An outstanding feature of the present invention resides in the combination, in a tape reeling control mechanism of a tape recorder, of a manual main switch electrically connected with a power source of said recorder for on-off-control of said source, and to a second switch which in turn is mechanically connected to a play-control means, such as a push button for this control service, and electrically connected with a tape reeling motor circuit; and a ripple-suppressing condenser electrically connected with an intermediate point between said both switches, on the one hand, and to earth, on the other hand.

In a preferred embodiment of the invention, said second switch is electrically connected to a junction which is in turn connected to a tape reeling motor through a transistored governor, such alternative connections being controlled by means of a third switch which is operated mechanically and independently from said play control means.

A further advantage is achieved when the third switch is a transfer switch, a stationary contact of which is connected to earth through a conductor including a regular diode as well as a Zener diode, for suppressing undesirous higher voltage current, if any, coming from said power source.

Referring now to the accompanying drawings, especially FIG. 1 thereof, 10 denotes an oscillator; 11 a main amplifier; 12 a preamplifier; 13 still a further amplifier for VU-meter; 14 an electric motor circuit having an electric motor M and a speed governor G therefor (FIG. 2); all being of conventional design so that the details have not been shown and described, except that a somewhat detailed connection of the circuit 14 is shown in FIG. 2.

Oscillator 10 is electrically connected through conductor 15 to a stationary contact 16 of a switch SW5 and amplifier 11 through conductor 18 to another stationary contact 17 of the switch. Amplifiers 12 and 13 are electrically connected through conductors 19 and 21 to junction 20 and switch contact 22, respectively. There is a diode D1 provided at an intermediate position between contact 17 and junction 20. A further diode D2 is similarly inserted between junction 20 and contact 22. As shown, the diodes D1 and D2 are arranged in opposite polarities to each other. Switch SW4 cooperates with stationary contacts 22 and 23 of which the latter is a nonfunctional off-service contact. Switches SW4–5 constitute a gang switch as shown by a dotted line. By means of any suitable manipulating mechanism such as a conventional push-button-operated link mechanism, the switches SW4–5 are simultaneously switched to either upper contacts 22 and 16, respectively, or lower contacts 23 and 17, respectively, as will be more fully described hereinafter.

Motor circuit 14 is electrically connected through conductor 24 to stationary terminal 26 of switch SW3 and through conductor 25 to lower stationary contact 28 of the switch. With conductor 24 energized, motor M, will run under the control of governor G so as to provide a relatively low constant speed such as 3,000 r.p.m. to a tape reeling mechanism to be described more fully hereinafter for recording or play-back operation of the tape recorder fitted with the novel circuit arrangement. On the other hand, when the conductor 25 instead of 24 is energized, the governor control is electrically disengaged so that the motor will run at a high speed such as 10,000 r.p.m. for fast feed or fast rewind operation of the tape recorder.

Switch SW5 is electrically connected through junction 29 and conductor 31 in which diode D3 is inserted, to junction 32, and conductor 30 extends from junction 29 to upper contact 27 of switch SW3. Junction 32 is earthed through Zener diode D4, on the one hand, and electrically connected through resistor R to junction 33, on the other hand. Junction 26 is electrically connected through conductor 34 which includes switch SW2, to junction 33 leading to a further junction 35. A branch conductor leads off from junction 35 to condenser C which is earthed. Junction 35 is electrically connected through switch SW1 and conductor 36 to a power source PS which may be either an A.C.-adapter or batteries.

Next referring to FIGS. 3–9, 40 denotes a brake operating member in the form of a slide which is slidably mounted on upper deck panel 41 of the machine which panel is shown, however, only in part to simplify the drawings. In its plan view, this slide 40 is shaped substantially into a T and formed with slots 42 and 43 loosely receiving guide pins 44 and 45, respectively, studded onto the said panel. A tension spring 45 is provided and urges the slide to move in the upward direction of FIGS. 3–4.

Chain-dotted lines 47 and 48 represent a tape-supply wheel and a take-up wheel, respectively, which are, however, shown only schematically for the purpose of simplicity. Chain-dotted line 49 denotes a magnetic tape which is normally fed from wheel 47 to wheel 48 in conventional manner.

Supply brake 50 is provided with a rubber brake roller 50*a* which is frictionally rotatable and kept normally in pressure engagement with the periphery of supply wheel 47 under the action of spring 51. Brake 50 is pivotably mounted around a pin 52 which is studded onto panel 41. The opposite end of brake 50 from brake roller 50*a* is outwardly bent so as to act as a kind of follower kept in engagement with roller 53 which is freely rotatable on one of the lateral arms of brake slide 40, thus acting as a kind of cam as well as a stop according to the operating condition of the tape-reeling mechanism.

Take-up wheel 48 is also provided with a brake 54. 55 denotes urging spring; 56 mounting pin; 54*a* rubber brake roller; and 57 the follower and stop roller. The construction of these parts is similar to those of the supply brake so that further description thereof is not necessary. It is however to be noted that the pressure angles of the two brake cams are different though arranged symmetrically relative to the brake slide so as to provide a considerably stronger brake action against the inertia of one or the other tape reeling wheel which is functioning as a take-up reel as determined by the running direction of the tape.

At the center of the lateral arm of T-brake slide 40, a bolted pin 58 is provided which passes with considerable clearance down through a slot 59 and is formed with an actuator 60 in the form of an enlarged cylinder. The actuator 60 is arranged to cooperate with elongated switch contacts 61 and 62 of switch SW2. Thus, the actuator 60, depending upon the position of the slide 40 either pushes the switch contact 62 into engagement with the contact 61 or permits these contacts to remain spaced apart as shown in full lines in FIG. 6 and by the phantom lines in FIG. 3, thereby giving on-off actuation of the switch SW2. This switch is mounted on the lower surface of deck panel 41 by means of fixing screws 64.

In FIG. 3, slide 40 is shown in its upper position under the action of spring 46 and both brakes 50 and 54 are kept in their braking position by means of brake springs 51 and 55, respectively, so that rollers 50*a* and 54*a* are also kept in pressure engagement with the peripheries of reeling wheels 47 and 48, respectively. In this case, actuator 60 occupies its off-service position shown by full lines in FIGS. 5–6, so that contacts 61 and 62 are kept in their spaced open position, thus switch SW2 is off. Thus, motor circuit 14 is de-energized and motor M and tape 49 do not run.

Figure 4:
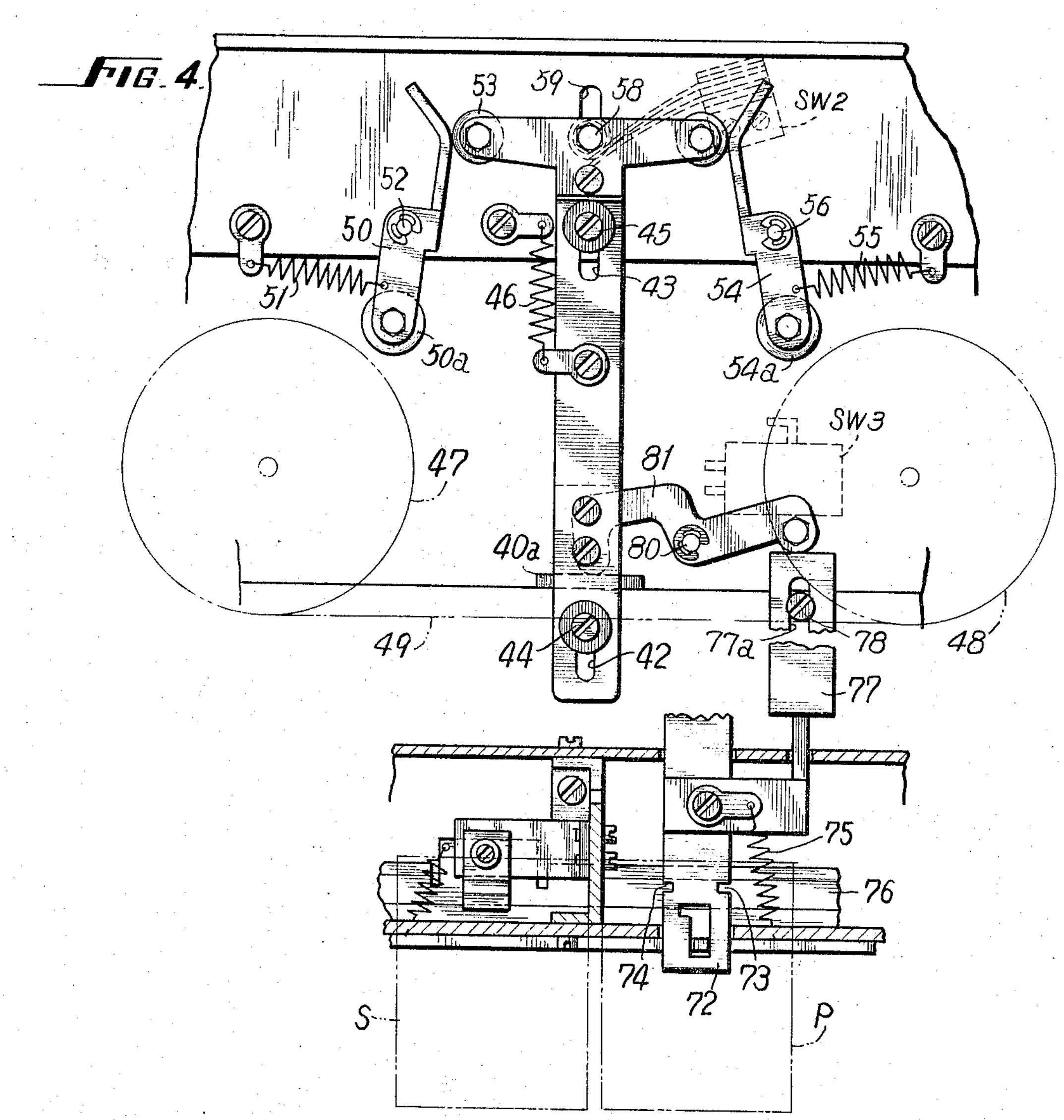
FIG. 4 is a similar view to FIG. 3, showing the off-service position of the brake mechanism.

In FIGS. 3 and 4, P and S denote a play control button and a stop button, respectively. These buttons are pivotably mounted on a round bar 70 which is mounted in turn fixedly on deck panel 41. Play button P is fitted rigidly with a stem 71 which is forked at its lower end and kept in hinge connection with notches 73 and 74 of a slide 72.

When button P is depressed as shown by chain-dotted line in FIG. 8, slide 72 is caused to advance from the position shown in FIG. 3 to that of FIG. 4. This position of slide 72 is positively locked by the engagement of a pivotably and spring-loaded stop bar 76. Slide 72 is fixedly fitted with arm 77 which is formed in turn with a slot 77*a* receiving slidably therein a stationary guide pin 78.

Switch SW3 is preferably a microswitch which is mounted on the lower surface of panel 41 and on-off controlled by one end of a bellcrank lever 81 which is pivotally supported as at 80.

A follower plate 40*a* is fixedly fitted on brake slide 40 and kept in pressure contact with the opposite end of lever 81. It will be clear from the foregoing that, when slide 72 and arm 77 are advanced in unison as described above, brake slide 40 is brought into its release position shown in FIG. 4.

When stop button S is depressed to its operative position shown by chain-dotted line in FIG. 9, its stem 82 causes stop bar 76 to pivot to its release position as shown also by chain-dotted line in the same figure, whereby stem 71 is disengaged from its locked position and spring 75 will bring the above described brake-and-switch control mechanism to its initial position. Stop button S is of non-lock type so that it returns to its normal or raised position under the action of an attached spring shown in FIG. 9.

Although not shown, buttons for recording, fast feed and fast rewind operations are also provided and, with the exception of the record button, these are permanently linked to brake slide 40. When any one of these buttons is depressed, with the single noted exception, brakes 50 and 54 are similarly released as described in the above described way with reference to play button P. Thereafter when the stop button is depressed, the previously depressed button will return to its normal position. Release is also effected in this manner of the record button.

Switch SW1 is a manual main switch and controlled separately from the above mentioned push button mechanism. It will be clear from the foregoing that switch SW2 is push-button controlled in such a way that only when stop button S is depressed it is turned off, and that switch SW3 is brought into engagement with its upper contact 27 only when the play button is depressed, whereas when any one of other push buttons with exception of record button is depressed, this switch is caused to make with its lower contact 28.

Gang switch SW4–5 is so arranged that it makes with its upper contacts 22 and 16, when the record button is actuated. Although not shown, this construction may be easily realized in combination with the record button in the similar way as described with switch SW3.

The switching sequences described above for all the switches in the circuit of FIG. 1 may be summarized as follows. Switch SW1 is manually controlled to on-off positions to connect and disconnect the overall circuit to battery or A.C. power. Switch SW2 is closed when any button except the stop and record button is depressed, and the switch is opened when the stop button is depressed. In the on position, the brakes **50*a* and 54*a* are released and in the off position the brakes are engaged. Switch SW3 connects to contact 27 only when the play button is depressed and connects to contact 28 when any other button except the record button is depressed. Switches SW4–5 connect to the contacts 22 and 16 when the record button is depressed, and connect to contacts 23 and 17** when any other button is depressed.

In the following, the operation of the machine will be described:

At first, manual switch SW1 is closed and the electrical arrangement shown in FIG. 1 is kept energized by current from power source PS such as batteries.

PLAYING OPERATION

In this case, play button P is depressed so as to release brakes 50 and 54 as shown in FIG. 4 as described hereinbefore, whereby simultaneously switch SW2 is caused to make and switch SW3 is transferred to its upper contact 27. As already mentioned, switches SW4–5 are transferred to their respective lower contacts 23 and 17, respectively.

Current will then flow from power source PS through conductor 36, switch SW1, junctions 35 and 33, conductor 34, switch SW2, junction 26 and conductor 24 to motor circuit 14 and the motor M will rotate at the specified low speed.

Simultaneously, current flows through a circuit: 26–SW3–27–30–29–SW5–17–18 to main amplifier 11.

On the other hand, preamplifier 12 is energized by current supplied through a circuit including: 17–D1–20–19.

VU-meter amplifier 13 is kept de-energized, although junction 20 is alive, since the polarity of diode D2 prevents such a current passage from establishing.

Simultaneously, current will flow from junction 29 through conductor 31, diode D3, junction 32 and Zener diode D4 to earth. When as the power source PS a conventional A.C.-adapter is used, the supply voltage may increase to a considerably higher value such as 10 volts or higher, especially at the time of non-load, even though a lower value such as 6.5 volts is employed for the design normal operating voltage. If such higher voltages should be impressed upon electronic components such as transistors in the machine, considerable troubles would result. In the present machine, however, current will flow through the circuit comprising: 29–31–D3–32, thus a properly maintained lower voltage such as 6.5 volts is supplied to the electronic components of the machine as controlled by the provision of the Zener diode. Thus, resistance R is in practice short-circuited in this case.

RECORD OPERATION

In this case, the play button and the record button are simultaneously depressed so that the brake slide 40 is caused to shift to its release position as before. Switches SW1–2 remain closed as before. Switches SW4–5 are, however, transferred to make with their upper contacts 22 and 16, respectively. Current will then flow from the power source through a circuit: 36–SW1–35–33–34–SW2–26–SW3–27–30–29–SW5–16–15; thus oscillator 10 is thereby energized. Since switch SW5 is disconnected from contact 17, main amplifier 11 is not energized. As in the case of the playing operation, current also flows through the circuit containing 29–31–D3–32–D4 to earth. Preamplifier 12 is also energized by the establishment of a circuit: 32–SW4–22–D2–20–19. Current will also be supplied to VU-meter amplifier through junction 22 and lead 21.

Motor M will run as in the case of the playing operation under the control of the governor G.

RECORD MONITOR OPERATION

In this case, record button only is depressed so as to transfer gang switch SW4–5 to the upper position shown in FIG. 1 to connect with contacts 22 and 16. Brake slide 40 is kept in its operative position as shown in FIG. 3 whereby brake rollers **50*a* and 54*a* remain engaged to the wheels 47 and 48. Switch SW2 therefore is in its off-position so that no current will flow to motor circuit 14 and thus motor M is kept at rest. In this operating condition of the machine, the tape 49 can not travel in any way. However, current will flow from junction 33 through resistor R, junction 32** and diode D4 to earth. Since the resistance of the motor circuit has been removed from the overall circuit of FIG. 1, ordinarily, a higher voltage current would flow to the several amplifiers or the like, which could result in damage to these components. In the circuit of the present invention, however, current will be supplied from the power source through resistor R, whereby the risk of such damage can be positively avoided since the supply current voltage will be kept at a predetermined lower constant level as at about 6.5 volts.

Current will flow, during the record monitor operation, through 32–SW4–22–21 to the VU-meter amplifier, on the one hand, and through 22–D2–20–19 to the preamplifier, on the other hand. Diode D1 is non-conductive in this case so that the main amplifier is dead.

FAST FEED OR FAST REWINDING OPERATION

In this case, the corresponding button is depressed, whereby the brake slide 40 is caused to shift to its release position shown in FIG. 4. Switches SW1 and SW2 are in their closed position and switches SW4–5 are brought into contact with the lower contacts 23 and 17, respectively. In this case, a weak current flows from the power source through such a circuit as: 36–SW1–35–33–R–32–D4.

Simultaneously, current will flow through 33–34–SW2–26–SW3–28–25 to motor circuit 14; thus governor G is short-circuited and thereby the motor is driven at a higher full speed such as 10,000 r.p.m. In view of the position of switches SW4–5, current cannot flow from the source through contact 22, which is disconnected, nor through contact 17 which though connected is nevertheless dead due to the non-conductive nature of the polarity of diode D3, whereby oscillator 10, main amplifier 11, preamplifier 12 and VU-meter amplifier 13 remain de-energized.

Condenser C acts as a ripple suppressor. As shown and described, this condenser is connected to an intermediate point between the main switch SW1 and motor circuit control switch SW2. Should the condenser be connected elsewhere other than the position shown, considerable loss of current would take place upon frequent on-off operation of the latter switch for energizing and de-energizing the tape-reeling motor M, because a considerable amount of charge would be discharged upon each break of the switch. This in turn would result in unnecessary waste of battery power or life when the machine is operated from batteries. In the circuit of the present invention, this disadvantage is eliminated since the condenser C is not affected by the closing and opening of switch SW2 and cannot drain the battery by discharge each time the switch SW2 is push button manipulated as described hereinabove.

It is to be understood that the above-described arrangement is illustrative of the application of the principles of the invention. Numerous other arrangements may be devised by those skilled in the art without departing from the spirit and scope of the invention.

What is believed to be new and desired to have protected by Letters Patent is defined in the appended claims.

What is claimed is:

1. In a tape reeling control mechanism for a tape recorder, the improvement comprising a power source, said source being series connected through a first and a second switch to circuit means for energizing a drive motor for the reels of said recorder, said first switch being manually operable to closed and open positions to correspondingly turn on and off power from said source, means for selecting a play function of said recorder, said second switch being automatically moved to closed position upon actuation of said play function selecting means, said circuit means having two parallel branches, one said branch being connected on one side to said second switch and on the other side to a transistor governor connected in turn to said drive motor, the other said branch containing a third switch one side of which is connected to said second switch and the other side of which is connected directly to said drive motor, said third switch being closed and opened automatically upon actuation and deactuation respectively of said play function selecting means, and a condenser one side of which is connected to the junction between said first and second switches and the other side of which is connected to ground, whereby discharge of said condenser is prevented during intermittent opening and closing of said second switch with said first switch closed.

2. The improvement as in claim 1 wherein said third switch is a double acting transfer switch, one position of said transfer switch providing the aforesaid direct connection between said second switch and said motor and the other position of said transfer switch connecting to a suppressor circuit means which includes a diode and a Zener diode connected in series to ground for suppressing potentially damaging high voltages.

3. The improvement as in claim 2 wherein the junction between said regular diode and said Zener diode is connected through a resistor to the junction between said condenser and said second switch.

4. The improvement as in claim 3 wherein said junction between said regular and Zener diode is connected to a fourth switch which when closed connects said junction to a VU-meter amplifier and a pre-amplifier of said recorder.

5. The improvement as in claim 3 wherein the junction between said regular diode and said other position of said third switch is connected to a fifth switch which in one position connects said junction to an oscillator of said recorder and in another position to said main amplifier and pre-amplifier.

6. The improvement as in claim 5 which includes means for selecting a record function of said recorder and wherein said fourth and fifth switches are ganged and are automatically operated by actuation of said record function selecting means.

References Cited

UNITED STATES PATENTS

| | | | |
|---|---|---|---|
| 2,676,212 | 4/1954 | Williams | 242—55.12 X |
| 2,991,022 | 4/1961 | Wallens | 242—75.51 |
| 3,037,093 | 5/1962 | Nowlan. | |
| 3,097,332 | 7/1963 | Mullin. | |

BERNARD KONICK, *Primary Examiner.*

GEORGE F. MAUTZ, *Examiner.*

J. R. GOUDEAU, *Assistant Examiner.*